United States Patent [19]

Ashworth

[11] Patent Number: 4,625,609

[45] Date of Patent: Dec. 2, 1986

[54] COUNTERBALANCING MECHANISM FOR SCROLL SAW

[75] Inventor: Steven W. Ashworth, Blawknox, Pa.

[73] Assignee: Delta International Machinery Corp., Pittsburgh, Pa.

[21] Appl. No.: 757,027

[22] Filed: Jul. 19, 1985

[51] Int. Cl.$^4$ ............................................ B27B 19/06
[52] U.S. Cl. ...................................... 83/748; 74/591; 83/615
[58] Field of Search ..................... 83/748, 615; 74/591, 74/603, 44

[56] References Cited

U.S. PATENT DOCUMENTS

| | | |
|---|---|---|
| Re. 7,726 | 6/1877 | Plummer . |
| 169,475 | 11/1875 | Pratt . |
| 170,456 | 11/1875 | Smith . |
| 189,461 | 4/1877 | House . |
| 220,705 | 10/1879 | Dearborn . |
| 398,803 | 2/1889 | Sedwick . |
| 1,544,425 | 6/1925 | Blank . |
| 1,820,294 | 8/1931 | Anderson . |
| 1,877,705 | 9/1932 | Tautz . |
| 2,090,195 | 8/1937 | Grob . |
| 2,208,843 | 7/1940 | Hedgpeth . |
| 2,595,464 | 5/1952 | Kaufmann ........................ 83/748 X |
| 2,639,737 | 5/1953 | Forsberg ........................... 83/748 X |
| 2,692,622 | 10/1954 | Heese . |
| 2,721,587 | 10/1955 | Dremel . |
| 2,942,483 | 6/1960 | Evans et al. ...................... 74/591 X |
| 4,503,742 | 3/1985 | Sutton . |
| 4,539,922 | 9/1985 | Klundt .............................. 74/591 X |

FOREIGN PATENT DOCUMENTS 2721842 11/1978 Fed. Rep. of Germany ........ 83/748

OTHER PUBLICATIONS

The Eagle Precision Scroll Saw, Exclusive "C" Arm for Safety, manufactured by RBI Industries, Inc., Pleasant Hill, Mo., date unknown.

Primary Examiner—Frank T. Yost
Attorney, Agent, or Firm—Merchant, Gould, Smith, Edell, Welter & Schmidt

[57] ABSTRACT

A scroll saw is disclosed having a yoke with upper and lower reciprocable arms terminating in upper and lower ends having a saw blade connected therebetween. A motor, with a horizontally extending drive shaft, is mounted on the base for the saw. A connecting rod is coupled eccentrically at one end to the drive shaft and at the other end to the lower arm of the yoke. A second shaft is rotatably mounted on the base parallel to the drive shaft and is driven by intermeshing gears on the shafts. First and second counterbalances are mounted on the shafts which rotate with the shafts in opposite directions. The counterbalances, each having a center of mass offset radially from an axis of the shaft, are positioned on the shafts so as to enhance or compound the inertial effects of the counterbalances in a vertical direction to cancel out the inertial effects of the reciprocating yoke, and so as to cancel the inertial effects of each other in a horizontal direction.

4 Claims, 3 Drawing Figures

COUNTERBALANCING MECHANISM FOR SCROLL SAW

BACKGROUND OF THE INVENTION

This invention relates to jig saws or scroll saws which have a saw blade connected between the free ends of the arms of a generally C-shaped or U-shaped member, or yoke, which is reciprocated about a pivot point at the closed end of the yoke to drive the saw blade. The base which supports the reciprocating member is usually provided with a table to support a workpiece, with the saw blade extending through an opening in the table. These saws are designed to reciprocate the saw blade at a high speed. This rapid reciprocation of the yoke creates large inertial forces which can result in severe vibration of the scroll saw. If this vibration is not controlled, the scroll saw will actually move about as a result of the vibration unless it is bolted or otherwise secured to a large mass. In order to overcome this vibration, it has been suggested that a counterbalance be coupled to the motor drive shaft. In this regard, reference is made to the Bill E. Sutton U.S. Pat. No. 4,503,742 dated Mar. 12, 1985, entitled "Precision Saw." The Sutton patent discloses a saw having a C-member which is reciprocated by a motor which rotates a drive shaft which in turn moves an eccentric drive arm coupled with the lower arm of the C-member through a drive linkage. The single counterbalance on the drive shaft has a center of mass offset radially from the axis of the drive shaft in a direction to counter the inertial effects of the reciprocating C-member. With this arrangement, and by selecting a couterbalance of the proper weight, the up and down inertial forces created by the reciprocating yoke or C-member can be effectively cancelled out to thereby reduce vibration. A problem with this type of unit, however, is that although the single counterbalance can be used to effectively eliminate vibration in a vertical direction, the counterbalance itself creates vibration in a horizontal direction. During every rotation of the counterbalance, the offset center of mass will create inertial forces in opposite directions in a horizontal plane. As a result, the saw will move or vibrate back and forth in that horizontal plane, resulting again in an unacceptable amount of movement of the saw.

SUMMARY OF THE INVENTION

In the present invention, the above-noted problem is overcome by using a pair of counterbalances which are constructed and arranged to not only cancel out the inertial effects of the reciprocating yoke in a generally vertical plane, but also function to cancel out the inertial effects of each other in a horizontal plane. In the preferred embodiment, the yoke is reciprocated by a motor mounted on the base which has a horizontally extending drive shaft and a connecting rod coupled eccentrically at one end to the drive shaft and coupled at the other end to the lower arm of the yoke. A counterbalance on the drive shaft has a center of mass offset radially from the axis of the shaft in a direction opposite the shaft from the coupling with the connecting rod so that the rotating counterbalance functions to partially cancel the inertial effects of the reciprocating yoke in a vertical direction. A second shaft is rotatably mounted on the base to extend parallel to the drive shaft and intermeshing gears on the shafts are provided such that rotation of the drive shaft in one direction causes rotation of the second shaft in the opposite direction. A second counterbalance is mounted on the second shaft having a center of mass offset radially from an axis of the second shaft in a direction to compound the inertial effects of the two counterbalances in a vertical direction and to cancel the inertial effects of the counterbalances in a horizontal direction. As a result of this arrangement, the vibrations of the reciprocating yoke in a vertical direction are cancelled by the rotating counterbalances and the inertial effects of the two counterbalances in a horizontal direction are cancelled. The result is a scroll saw which can be driven at a high speed without creating any significant amount of vibration.

DETAILED DESCRIPTION OF THE INVENTION

Figure 1:
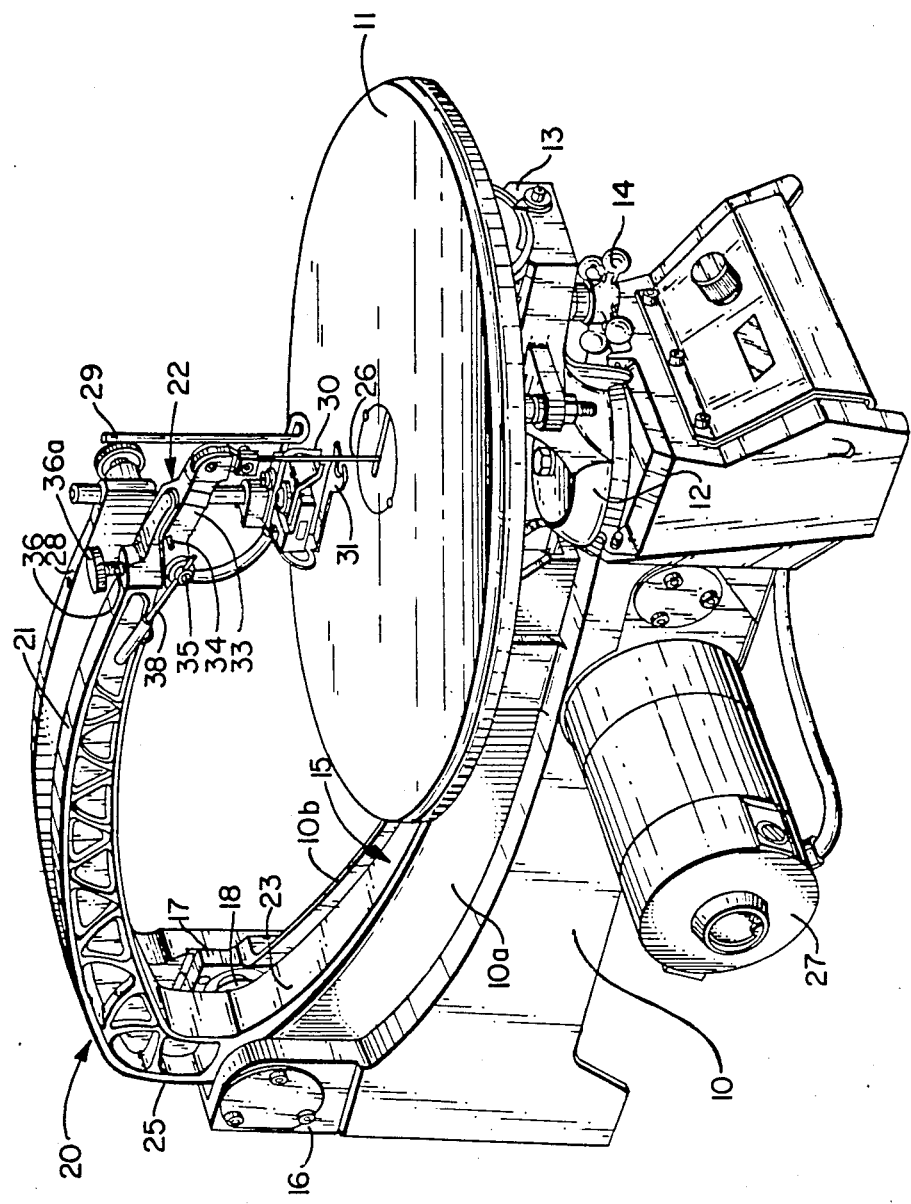
FIG. 1 is a view in perspective taken from one side and generally above a C-arm scroll saw according to my invention.

Referring now to the drawings, wherein like numerals are used throughout the several views to identify like elements of the invention, there is disclosed a scroll saw having an elongated base 10 having a table 11 mounted at one end to support a workpiece. Table 11 is mounted on a support frame including a swivel member 12 which permits the table to be rotated about a vertical axis, and a trunion assembly 13 which can be released by a star handwheel 14 to permit the table to be tilted about an axis extending generally along the length of the base 10.

Base 10 includes oppositely disposed side wall members 10a, 10b defining between them an elongated opening or well 15. At the end of base 10 opposite from table 11 side wall members 10a, 10b define a pair of upstanding, spaced bearing support members 16, 17. Mounted between the bearing support members 16, 17 for rotation therein is a horizontally extending pivot shaft 18.

A yoke or C-arm member 20 is provided having an upper arm 21 terminating in an upper end 22, a lower arm 23 terminating in a lower end 24, and a curved bight 25 connecting the upper arm 21 and the lower arm 23. Bight 25 of C-arm member 20 is mounted on pivot shaft 18. A saw blade 26 is connected between upper end 22 and lower end 24 and an electric motor 27 is provided to reciprocate C-arm member 20 on pivot shaft 18 to effect movement of the saw blade 26.

A support arm 28 connected at its rear end to bearing support member 17 extends along upper arm 21 and at its free end provides support for a blade guard 29, an air nozzle 30 and a holddown member 31.

A releasable blade tensioning device 33 is pivotally mounted to upper end 22 of upper arm 21 for pivotal movements about a horizontally extending pivot pin 34 between a blade tensioning position and a blade tension releasing position. A manually rotatable cam member 35 is mounted on the end of blade tensioning member 33 opposite from its connection to saw blade 26 for engagement with the bottom end of a manually adjustable pin 36 which extends through and is threadedly engaged with an opening in upper arm 21.

One end of drive motor 27 is secured over an opening in side wall member 10a through which a horizontally extending drive shaft 27a extends. Mounted on drive shaft 27a between side wall members 10a and 10b is a circular gear 40, having peripheral teeth, which is bolted to a counterbalance 41. Counterbalance 41 has a axially extending hub member 41a which extends through a central opening in gear 40, the counterbalance 41 being shaped generally as a circular segment (pie-shaped) having a center of mass offset radially from the axis of shaft 27a. Counterbalance 41 has a radially extending lobe 41b which is rotatably coupled to the bottom end of a connecting rod 42 having a top end rotatably coupled to lower arm 23 of yoke 20. Thus, the bottom end of connecting rod 42 is eccentrically coupled to drive shaft 27a by means of lobe 41b so that rotation of drive shaft 27a causes reciprocation of connecting rod 42 and thus yoke 20. The center of mass of counterbalance 41 is offset radially from the axis of shaft 27a in a direction directly opposite shaft 27a from lobe 41b which couples with the connecting rod 42. The center of mass and the coupling with the bottom end of the connecting rod are thus 180° apart. As lobe 41b reaches the top point of its rotation, yoke 20 is also moved by connecting rod 42 to the top point of its movement. At that point, the center of mass of counterbalance 41 is directly below shaft 27a and the inertial forces created by the rotating center of mass are directed downwardly, while the inertial forces created by the moving yoke are directed upwardly. Because the two forces are acting in opposite directions at that point, they tend to cancel each other.

Figure 2:
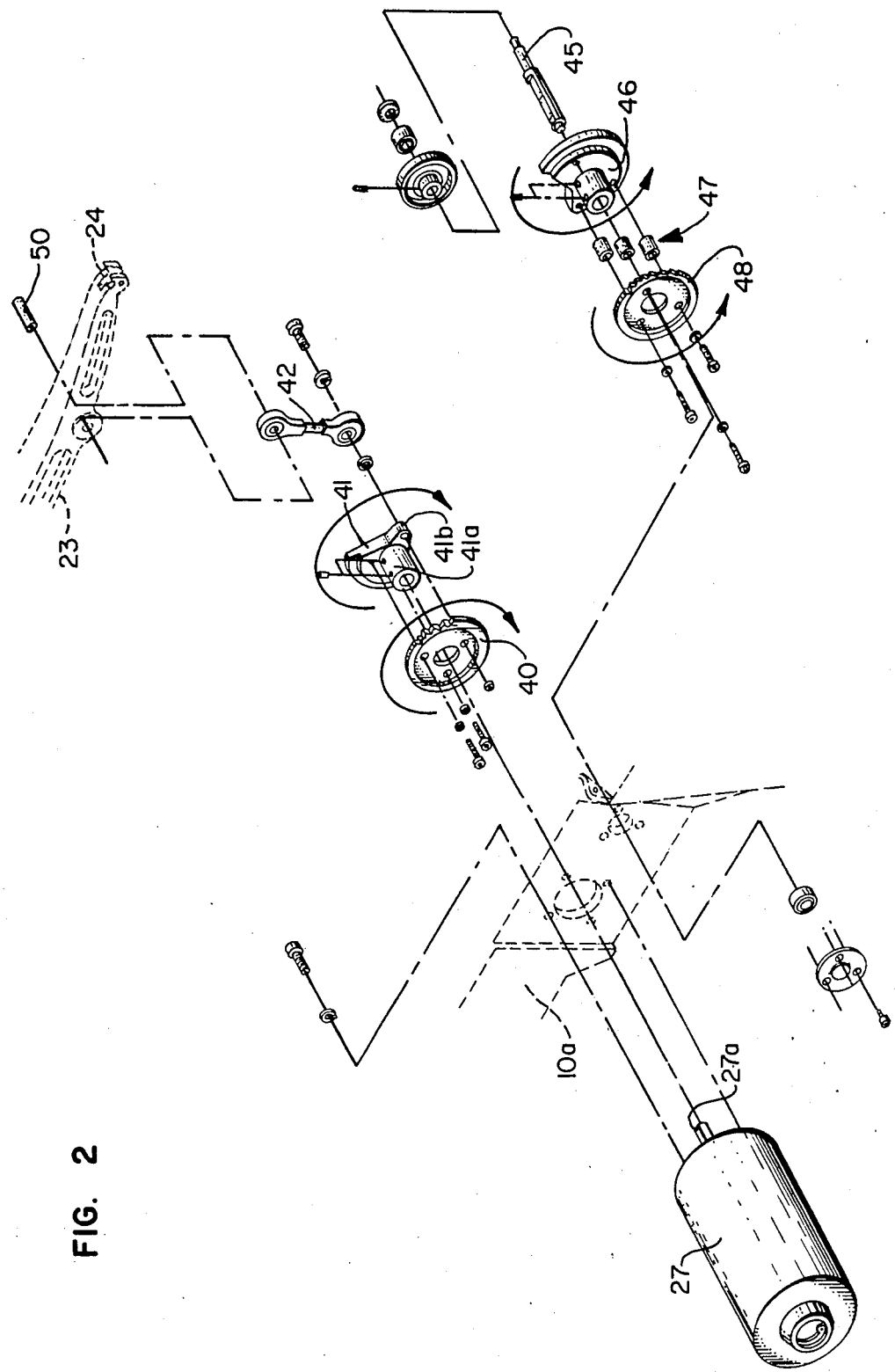
FIG. 2 is a fragmentary exploded view of the counterbalancing mechanism for the yoke of the scroll saw.
Figure 3:
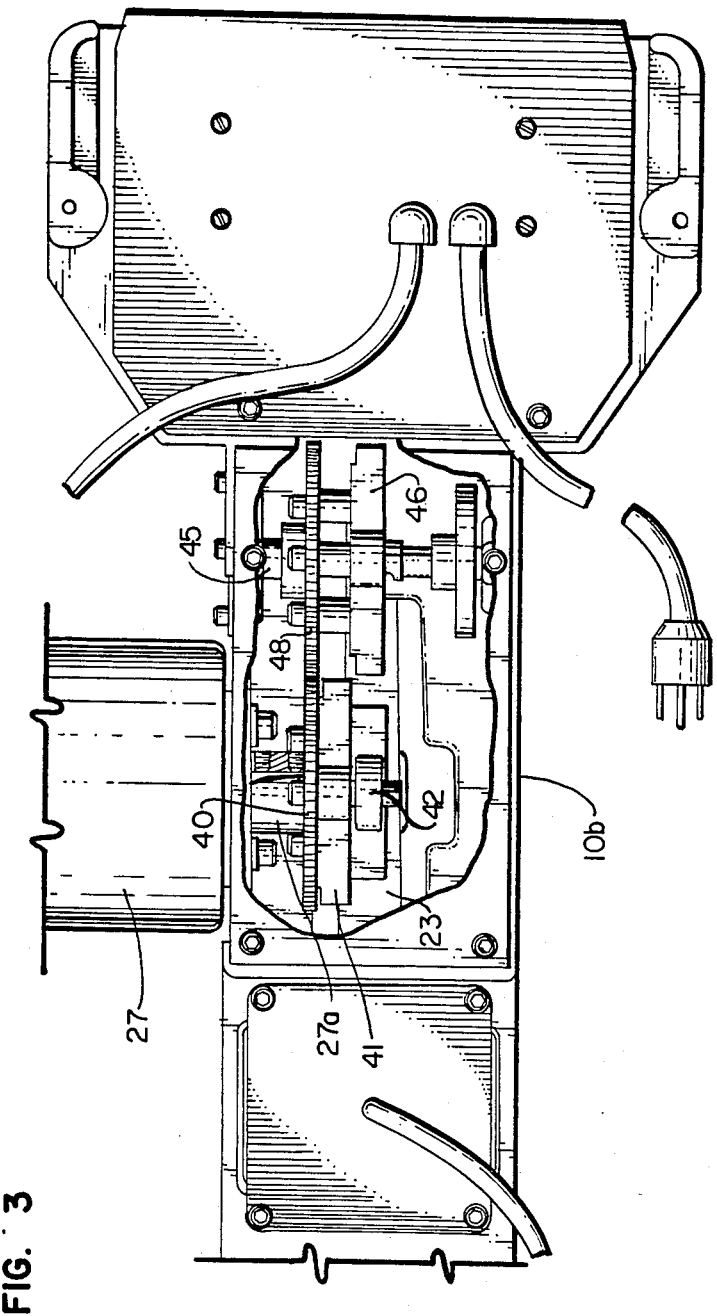
FIG. 3 is an enlarged fragmentary view, taken from the bottom of the unit, of the counterbalancing mechanism, portions thereof being broken away.

The scroll saw described herein is designed to operate at speeds as high as 2,000 strokes per minute. At those speeds, the yoke, which is preferably made from cast aluminum, will create high inertial forces which must be cancelled out if excessive vibration is to be avoided. To assist in further reducing vibration, a second shaft 45 is rotatably mounted between side wall members 10a, 10b and extends parallel to and is spaced from drive shaft 27a. Second shaft 45 has a second counterbalance 46 mounted thereon to which is attached by means including a plurality of spacers 47 a circular gear 48 having a toothed periphery which is engaged with the periphery of gear 40. The gears intermesh such that rotation of drive shaft 27a in one direction causes rotation of second shaft 45 in the other direction. The two counterbalances 41, 46 thus also rotate in opposite directions. Second counterbalance 45 has basically the same construction as counterbalance 41 and has a center of mass offset radially from an axis of second shaft 45 in a direction to enhance or compound the inertial effects of the counterbalances 41, 46 in a vertical direction, and to cancel the inertial effects of counterbalances 41, 46 in a horizontal direction. More specifically, if the counterbalances 41 and 46 are rotated in the direction of the arrows their centers of mass, which are located radially outwardly from the axis along a line bisecting the pie-shaped segment of each, will reach the high point of their rotation at the same time creating upwardly directed inertial forces which enhance or compound to cancel the inertial forces created by the yoke which is then moving to the bottom of its path of travel. If the two counterbalances 41, 46 then rotate another 90°, the centers of mass will lie between the two shafts 27a, 45 along a horizontal line extending through the axes of the shafts. At that point, the inertial forces being created by the two counterbalances are directly opposed. The weights of the two counterbalances are preferably the same, so that the forces are thus cancelled out resulting in no net horizontal component of force. If the counterbalances are rotated another 90°, they both reach the bottom points of their cycle at the same time thus compounding their inertial forces to cancel out the inertial force created by the then upwardly moving yoke. If the counterbalances are rotated another 90° to the position shown in FIG. 2, the two inertial forces created by the counterbalances are directed horizontally outwardly in opposite directions, again cancelling each other out. The result is that the vertial inertial forces created by the reciprocating yoke are cancelled out by the cooperation of the two counter-rotating counterbalances, their total weight being selected so as to effectively counterbalance the inertial forces created by the moving yoke. The two rotating counterbalances 41, 46 then cancel each other out in the horizontal direction.

In order to further reduce the creation of unnecessary or undesirable inertial forces, the upper end of connecting rod 42 is pivotally connected to lower arm 23 by means of a pivot pin 50 which extends through an opening in a pair of depending flanges on lower arm 23, which flanges extend over a bearing assembly at the upper end of connecting rod 42, the pin 50 extending through the center of percussion of the yoke 20. At the center of percussion, the yoke has no tendency to twist about that point as a result of forces exerted on that point by the connecting rod 42. To phrase it differently, no inertial couple is created about pin 50 as a result of the forces exerted upon yoke 20 by connecting rod 42.

The present invention thus provides a scroll saw which is carefully balanced and which will operate at high speed with substantially no vibration being created by the reciprocating yoke.

I claim:

1. A scroll saw, comprising:
(a) a base having a table and a horizontal pivot shaft spaced therefrom;
(b) a yoke having upper and lower arms and a curved bight connecting said arms, said arms terminating in upper and lower ends having a saw blade connected therebetween and extending through said table, said yoke having a center of percussion disposed at a predetermined point on said lower arm;
(c) mounting means for mounting said yoke on said pivot shaft at said curved bight; and
(d) reciprocating means for reciprocating said yoke about the axis of said pivot shaft to effect movement of said saw blade, said reciprocating means including a first shaft mounted for rotation about an axis, means for rotating said first shaft about said axis, a connecting rod having a first end and a second end, eccentric coupling means for eccentrically connecting said first end to said first shaft for said second end to reciprocate as said first shaft rotates, means for connecting said second end to said predetermined point, a first counterbalance on said first shaft having a center of mass offset radially from the axis of said first shaft in a direction directly opposite said shaft from said eccentric coupling means with said connecting rod, a second shaft rotatably mounted on said base extending parallel to said first shaft, intermeshing gears on said first and second shafts whereby rotation of said first shaft in one direction causes rotation of said second shaft in the opposite direction, and a second counterbalance on said second shaft having a center of mass offset radially from an axis of said second shaft in a direction to enhance the inertial effects of said counterbalances in a vertical direction and to cancel the inertial effects of said counterbalances in a horizontal direction.

2. The scroll said of claim 1 wherein said eccentric coupling means comprises a lobe on said first counterbalance which extends radially from said first counterbalance in a direction directly opposite said first shaft from said center of mass and said first end of said connecting rod coupled to said lobe.

3. The scroll saw of claim 1 wherein said counterbalances each comprise a hub and a radially extending portion configured generally as a segment of a circle.

4. The scroll saw of claim 1 wherein in one rotated position of said counterbalances said centers of mass lie between said shafts on a horizontal line extending through the axes of said shafts.

* * * * *